Aug. 22, 1967          R. A. PLOG          3,337,157
WELDING REEL HUB AND BRAKE ASSEMBLY
Filed Sept. 13, 1965                        3 Sheets-Sheet 1
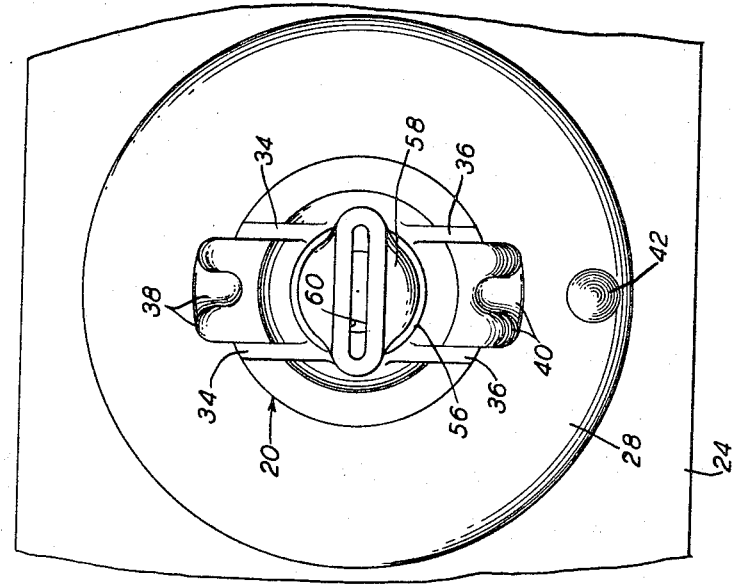
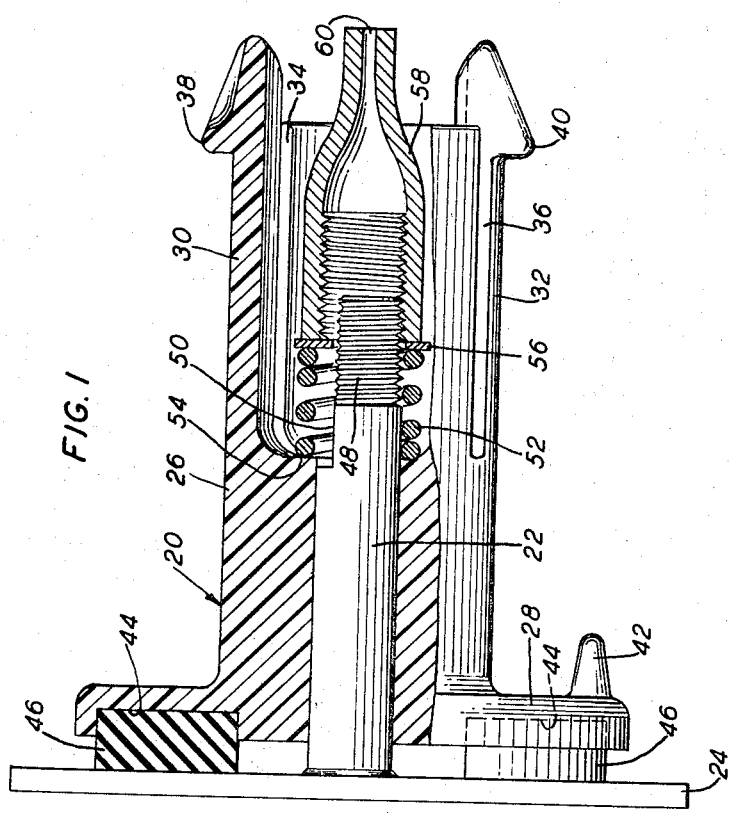
INVENTOR
RICHARD A. PLOG
BY
Edmund W Bopp
AGENT

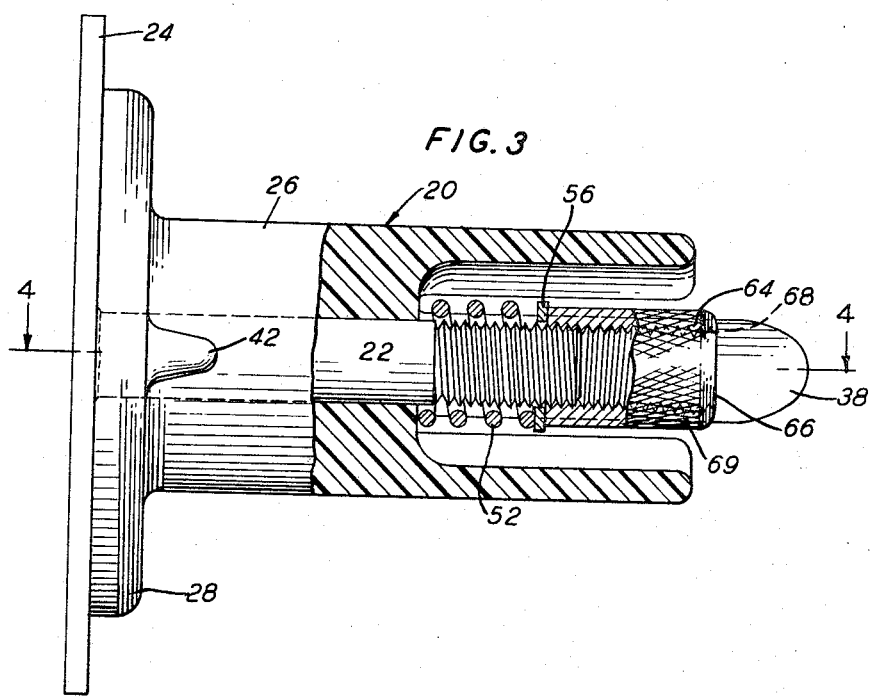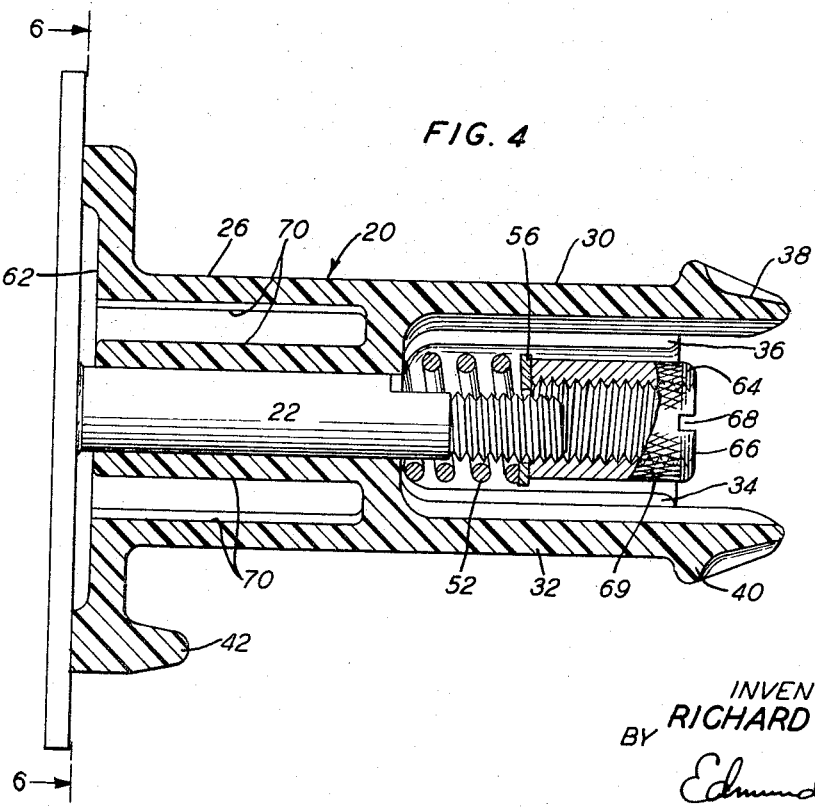

Aug. 22, 1967  R. A. PLOG  3,337,157
WELDING REEL HUB AND BRAKE ASSEMBLY
Filed Sept. 13, 1965  3 Sheets-Sheet 3

INVENTOR
BY RICHARD A. PLOG

Edmund W Bopp
AGENT

United States Patent Office 3,337,157
Patented Aug. 22, 1967

3,337,157
WELDING REEL HUB AND BRAKE ASSEMBLY
Richard A. Plog, Clifton, N.J., assignor to Air Reduction Company, Incorporated, New York, N.Y., a corporation of New York
Filed Sept. 13, 1965, Ser. No. 486,654
8 Claims. (Cl. 242—129.8)

This invention relates to apparatus for supporting a feed wire reel or spool while feeding the wire into the region of an electric arc, the wire serving as an arc electrode or as a filler wire or the like.

An object of the invention is to reduce the cost of manufacturing of the reel supporting assembly, particularly the hub, so that the latter may be considered expendable, to be discarded when no longer serviceable, after a service life which is relatively long in proportion to its cost.

Another object is to reduce the danger of electrical short circuit occurring between the wire and other parts of the welding machine.

Another object is to reduce the weight of the hub while retaining the same or greater strength.

A feature of the invention is that there is a braking effect provided which is adjustable without disassembly and, in fact, while the reel is rotating.

Another feature is that the reel or spool may be snapped onto the hub and is easily released for removal.

Another feature is that the hub retains the reel in place after a snap-on operation without involving a second operation on any retaining member.

Another feature is that the hub may be molded of plastic material in a single piece.

Another feature is that the hub and the axle upon which it turns have a minimum of parts.

A further feature is the use of one or more replaceable braking members mounted upon the axle or hub to rub against a friction plate.

A further feature is that the plastic material of the hub may, if desired, be used as the braking material without need for separate braking members.

A further feature is that a braking surface on the hub is located a maximum distance from the center of rotation and so has increased effectiveness when used for braking.

The hub is a unitary member, preferably molded of a suitable plastic with slots at one end to form flexible finger-like elements with protuberances for retaining the reel or spool in place. The hub is carried on an axle which constitutes a stud mounted upon a friction plate which latter forms one member of a braking device. The hub has a base portion which may either bear directly upon the friction plate forming the other member of the braking device, or the base portion may carry one or more braking elements. The plastic from which the hub is molded is preferably one which has suitable braking properties with respect to the axle and friction plate.

The base portion of the hub is pressed against the friction plate by a helical spring that surrounds the axle and bears against a shoulder in the hub. The spring is compressed to an adjustable degree by a nut which is threadedly mounted at the free end of the axle and which can be hand tightened and/or tightened using a screwdriver or like tool.

The reel or spool is installed upon the hub by pushing it on over the finger-like members, the protuberances of which are so shaped as to facilitate the installation and the retention of the spool in place. The brake adjusting nut can be adjusted with the spool in place and even while the spool and hub are turning.

Other objects, features and advantages will appear from the following more detailed description of illustrative embodiments of the invention, which will now be given in conjunction with the accompanying drawings.

In the drawings,

FIG. 1 is a side elevational view, partly in section, of a hub, axle and friction plate in accordance with one embodiment of the invention;

FIG. 2 is an end elevational view of the device shown in side view in FIG. 1;

FIG. 3 is a side elevational view, partly in section, of a hub, axle and friction plate in accordance with another embodiment of the invention;

FIG. 4 is a plan view, partly in section, taken along the line 4—4 in FIG. 3;

Figure 5:
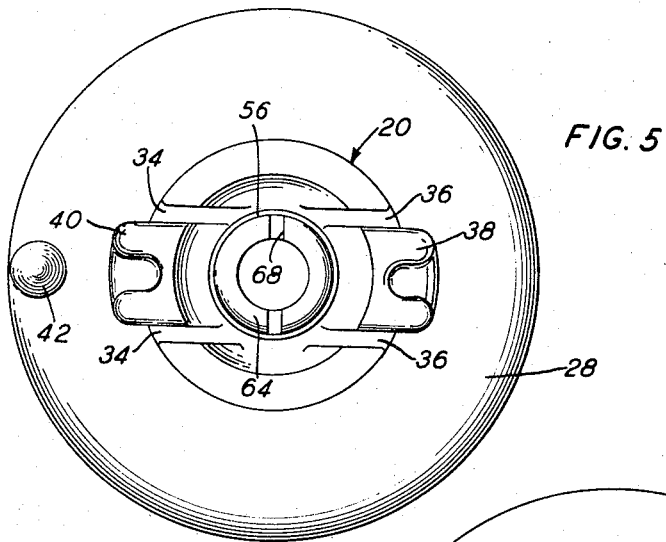
FIG. 5 is an end view taken along the line 5—5 in FIG. 3.
Figure 6:
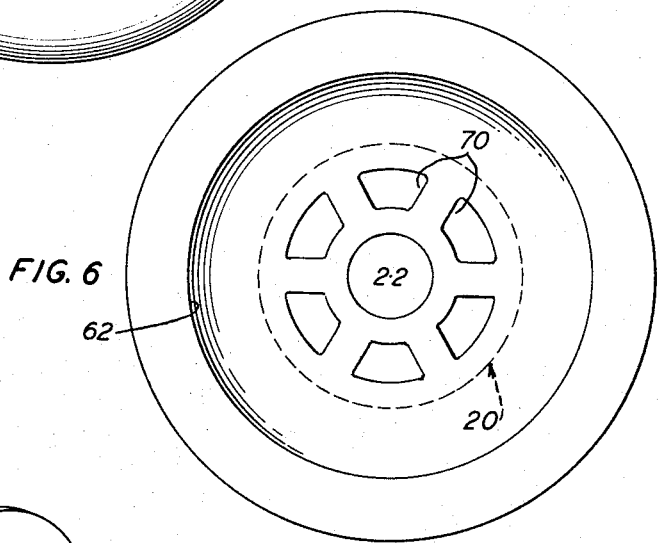
FIG. 6 is another end view, taken along the line 6—6 in FIG. 4.

Referring to FIGS. 1 and 2, a hub 20 is shown in place upon an axle 22 which latter is mounted as a stud upon a base plate 24. The hub 20 comprises a cylindrical reel-receiving portion 26 and a base portion 28. The portion 26 has one or more flexible finger-like parts illustrated herein as two fingers 30 and 32 defined by axial grooves as at 34 and 36, and having protrusions or protuberances 38 and 40, respectively. The portions 38 and 40 are so shaped as to be depressed by pushing a reel against the exposed end of the cylindrical portion 26. Upon sliding the reel into place, the portions 38 and 40 spring back to the positions shown in FIGS. 1 and 2 and their shape is such as to tend to retain the reel securely in place. A boss 42 is provided on the base portion 28 to key in a matching hole in the reel, so that when the reel is in place the latter is constrained to rotate as a unit with the hub 20.

The reel may be removed from the hub when desired by manually depressing parts 38 and 40 and pulling the reel over them while they are so depressed.

Figure 7:
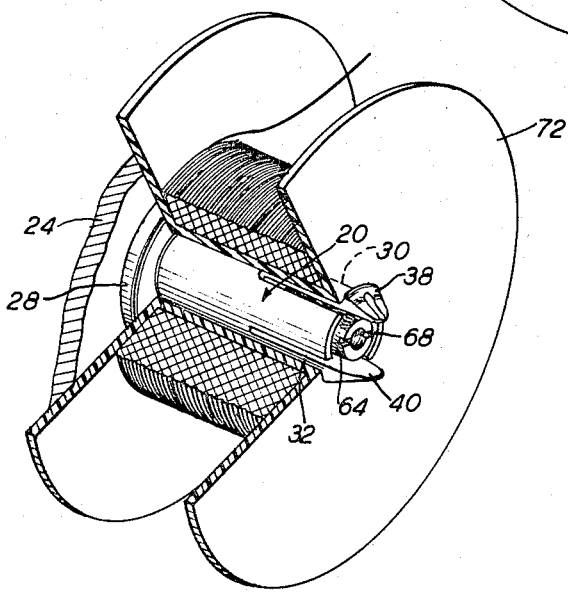
FIG. 7 is a perspective view partly in section, of a welding reel mounted upon a hub in a reel supporting device like those shown in the preceding figures.

A perspective view on a reduced scale of a reel in place upon the hub 20 is shown in FIG. 7.

The base portion 28 is shown with a plurality of sockets 44 therein facing the base plate 24, each said socket being fitted with a replaceable braking member comprising an insert 46. The members 46 are held in place by a spring 52 and so need not be fastened to the base 28. The members 46 are preferably located near the periphery of the base 28 in order to increase their effectiveness for braking by being as far as possible from center. The unit can also be used with braking members 46 removed, with the plastic hub bearing against a friction surface.

The axle 22 is threaded at its free end over a region 48. The axle 22 has a flat facet 50 extending through and beyond the threaded portion. A helical compression spring 52 is assembled over the axle 22 and facet 50 and bears against a shoulder 54 in the hub 20. A washer 56 with a D-shaped hole is assembled at the outer end of the spring 52 and a nut 58 meshes with the threaded portion 48 of the axle 22 so as to compress the spring 52 between the shoulder 54 and the washer 56, thereby exerting pressure for braking action between the braking members 46 and the base plate 24, the pressure being adjustable by means of the nut 58. The nut 58 is shown as being formed from an internally threaded tube the outer end of which has been shaped to form a slot 60 for receiving a screwdriver or equivalent tool and a surface for tightening by hand. Alternatively, the nut 58 may be made of metal or molded plastic.

Referring now to FIGS. 3–6, there is shown an alternative embodiment. Here, the sockets 44 and braking members 46 are dispensed with and instead part of the base portion 28 is made to bear upon the base plate 24 for braking effect. The plastic used in molding the hub 20 is so chosen as to provide the desired braking property. The base portion 28 is provided with a central recess 62 so that the braking takes place at the periphery where it is most effective. The adjusting nut is shown at 64 and it differs from the nut 58 shown in FIGS. 1 and 2 by being open at the end 66 which is provided with a screwdriver slot 68 and a surface for hand tightening, such as a knurled surface 69. As in the case of the arrangement shown in FIGS. 1 and 2, the nut is used to adjust the amount of braking effect obtained. The reel-receiving portion 26 of the hub 20 may be lightened without significant loss of strength and without interfering with its function of holding the reel, by forming a plurality of axial slots 70 therein.

If desired, the recess 62 may be omitted and the entire surface of the base portion 28 made to bear upon the base plate 24 to constitute the braking effect. If desired also a separate disc of braking material may be inserted between the plastic hub and the base plate. If a separate braking disc is used, the base portion 28 can be considerably reduced in size.

Referring to FIG. 7, a reel 72 is shown in place on the hub. The tips of the finger-like members 30 and 32 appear with the protuberances 38 and 40 holding the reel 72 in place upon the hub 20.

It will be evident that the amount of friction may be controlled by means of the materials of the moving and stationary parts respectively that are in contact during revolution, and by means of the radial distance of the contacting materials from the center of revolution. It will also be evident that inserts of materials with desired frictional qualities may be mounted between the moving parts or upon either such part, as desired.

While illustrative forms of apparatus and methods in accordance with the invention have been described and shown herein, it will be understood that numerous changes may be made without departing from the general principles and scope of the invention.

What is claimed is:

1. In welding apparatus, an axle for supporting a hub carrying a spool of feed wire, said axle being in the form of a stud attached to a friction plate, a hub rotatably mounted upon said axle, a braking member carried by said hub and arranged to rub against said friction plate, said stud being generally cylindrical with a flat facet extending inwardly from the free end of the axle, said flat facet being parallel to the axis of the stud, said stud being threaded over a portion of its length extending inwardly along the stud toward said friction plate, a helical spring mounted upon the free end of the stud and bearing against a portion of the hub, a nut-like member in threaded engagement with the threaded portion of said stud and a D-shaped washer between said nut-like member and said spring, said nut-like member being operative to exert pressure to compress said spring against its bearing upon the hub to control the frictional force between said braking member and said friction plate, and said nut-like member being accessible for adjustment with a spool in place upon the hub.

2. Apparatus according to claim 1, in which the said nut-like member is so shaped as to be adjustable by hand.

3. Apparatus according to claim 1, in which the said nut-like member is so shaped as to be adjustable by means of a screwdriver or the like.

4. Apparatus according to claim 1, in which the said nut-like member is so shaped as to be adjustable by hand and also by means of a screwdriver or the like.

5. Apparatus according to claim 1, in which the said braking member comprises a plurality of replaceable inserts of braking material set into the hub in position to rub against the said friction plate.

6. Apparatus according to claim 5, in which the said inserts are located near the periphery of the hub.

7. Apparatus according to claim 1, in which the said braking member comprises an annular surface of the hub.

8. In welding apparatus, an axle for supporting a hub carrying a spool of welding wire, said axle being in the form of a stud attached to a friction plate, a hub rotatably mounted upon said axle, a braking member carried by said hub on the side thereof directly adjacent to the said friction plate, said hub comprising a single piece of molded plastic material with a spool-supporting portion over which a spool can be slid into position; said cylindrical portion having slots therein substantially parallel to the longitudinal axis thereof and open at the end from which the spool is to be slid into place, at least one resilient finger-like portion defined by said slots, said finger-like portion having a spool retaining protuberance at the point thereof, said finger-like portion being depressible upon the spool striking said protuberance to permit the spool to pass over said protuberance into place on the hub, said protuberance being so shaped as to facilitate the passage of the spool thereover and to retain the spool in place upon said resilient finger-like portion springing back to its original undepressed position, and adjustable force means linking said axle and hub such that the hub is pressed toward said friction plate.

References Cited

UNITED STATES PATENTS 1,851,722  3/1932  Moore _____ 242—55.2
3,225,373  12/1965 Kisbany _____ 15—104

LEONARD D. CHRISTIAN, *Primary Examiner.*